(12) United States Patent
Zhang (10) Patent No.: US 10,754,296 B1
(45) Date of Patent: Aug. 25, 2020

(54) HOLOGRAPHIC DISPLAY AND DISPLAY METHOD THEREOF AND DISPLAY DEVICE

(71) Applicant: BOE TECHNOLOGY GROUP CO., LTD., Beijing (CN)

(72) Inventor: Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 415 days.

(21) Appl. No.: 15/751,665

(22) PCT Filed: Aug. 24, 2017

(86) PCT No.: PCT/CN2017/098829
§ 371 (c)(1),
(2) Date: Feb. 9, 2018

(87) PCT Pub. No.: WO2018/141152
PCT Pub. Date: Aug. 9, 2018

(30) Foreign Application Priority Data

Feb. 6, 2017 (CN) .......................... 2017 1 0067032

(51) Int. Cl.
*G03H 1/22* (2006.01)
*G03H 1/02* (2006.01)

(52) U.S. Cl.
CPC ......... *G03H 1/2294* (2013.01); *G03H 1/2205* (2013.01); *G03H 1/2286* (2013.01);
(Continued)

(58) Field of Classification Search
None
See application file for complete search history.

(56) References Cited

U.S. PATENT DOCUMENTS

| 2008/0037282 | A1 | 2/2008 | Kurihara | |
|---|---|---|---|---|
| 2010/0027083 | A1* | 2/2010 | Kroll | G03H 1/02 359/9 |
| 2015/0077514 | A1* | 3/2015 | Yamaichi | G03H 1/2205 348/40 |

FOREIGN PATENT DOCUMENTS

| CN | 1672092 A | 9/2005 |
|---|---|---|
| CN | 101743519 A | 6/2010 |

(Continued)

OTHER PUBLICATIONS

First Office Action for CN Application No. 201710067032.7, dated Feb. 28, 2019.

(Continued)

*Primary Examiner* — Jennifer D. Carruth
(74) *Attorney, Agent, or Firm* — Dinsmore & Shohl LLP (57) ABSTRACT

The present disclosure provides a holographic display and a display method thereof, and a display device. A holographic display comprises: a light source support; a light emitting member including at least one light source and provided on the light source support; a first spatial light modulator and a second spatial light modulator respectively located at both sides of the light emitting member; a first semi-transmissive semi-reflective film located at a side of the first spatial light modulator which is adjacent to the light emitting member; and a second semi-transmissive semi-reflective film located at a side of the second spatial light modulator which is adjacent to the light emitting member. According to the technical solutions provided by the present disclosure, a light and thin holographic display can be provided, and during holographic displaying, a single-side display or a double-sides display can be achieved.

18 Claims, 5 Drawing Sheets

(52) U.S. Cl.
CPC .............. *G03H 2001/0212* (2013.01); *G03H 2001/0224* (2013.01); *G03H 2001/2228* (2013.01)

(56) References Cited

FOREIGN PATENT DOCUMENTS

| CN | 104021739 A | 9/2014 |
| CN | 104407440 A | 3/2015 |
| CN | 106094488 A | 11/2016 |
| CN | 106200340 A | 12/2016 |

OTHER PUBLICATIONS

Second Office Action for CN Application No. 201710067032.7, dated Apr. 18, 2019.
International Search Report and Written Opinion for International Appl. No. PCT/CN2017/098829, dated Nov. 17, 2017.

* cited by examiner

HOLOGRAPHIC DISPLAY AND DISPLAY METHOD THEREOF AND DISPLAY DEVICE

CROSS REFERENCE TO RELATED APPLICATIONS

This application is a U.S. National Stage under 35 U.S.C. § 371 of PCT/CN2017/098829, filed on Aug. 24, 2017, which claims priority to Chinese Application No. 201710067032.7 filed on Feb. 6, 2017, the disclosure of which is hereby incorporated by reference in its entirety as a part of this application.

TECHNICAL FIELD

The present disclosure relates to a holographic display and a display method thereof, and a display device.

BACKGROUND

Holographic display technology is considered to be an ultimate solution for realizing 3D display. The backlights of the existing holographic displays use a laser or light emitting diode (Light Emitting Diode, LED) light source plus a beam expanding collimator lens to provide beam expansion and collimation for the light source, so as to illuminate the entire spatial light modulator.

In general, a spatial light modulator contains many individual units spatially arranged in a one-dimensional or two-dimensional array, each of which may be independently controlled under an optical signal or an electrical signal, and change its own optical properties according to such signal, thereby modulating the light wave illuminated thereon. The devices of such category may change the amplitude or intensity, phase, polarization state and wavelength of the light distribution in space, or convert incoherent light into coherent light, under the control of an electrical drive signal or other signals which varies or vary over time. The spatial light modulators can be generally divided into reflective type and transmissive type according to different readout manners of reading-out light; and may also be divided into optical addressing type and electrical addressing type according to different manners of inputting a control signal. The most common spatial light modulator at present is liquid crystal light valve.

In the prior art, since the backlight source needs many optical members to constitute a huge optical system, there is a large overall volume, and displaying can only be provided on one side.

SUMMARY

The present disclosure provides a holographic display and a display method thereof, and a display device, which can provide a light and thin holographic display, and during holographic displaying, displaying can provided on one side, and it may also be displayed on both sides.

According to an aspect of the present disclosure, a holographic display is provided which comprises: a light source support; a light emitting member including at least one light source and provided on the light source support; a first spatial light modulator and a second spatial light modulator respectively located at both sides of the light emitting member; a first semi-transmissive semi-reflective film located at a side of the first spatial light modulator which is adjacent to the light emitting member; and a second semi-transmissive semi-reflective film located at a side of the second spatial light modulator which is adjacent to the light emitting member.

For example, the first semi-transmissive semi-reflective film and the second semi-transmissive semi-reflective film may be disposed opposite to each other, and their projections on a plane parallel to a display surface of the display may at least partially overlap with each other.

For example, the projections of the first semi-transmissive semi-reflective film and the second semi-transmissive semi-reflective film on the plane parallel to the display surface of the display may fully overlap with each other, and the light emitting member may be disposed between the first semi-transmissive semi-reflective film and the second semi-transmissive semi-reflective film.

For example, the light source support is a transparent substrate which is provided between the first spatial light modulator and the second spatial light modulator.

For example, the light source is disposed at a side of the transparent substrate which is adjacent to the first semi-transmissive semi-reflective film, and/or the light source is disposed at a side of the transparent substrate which is adjacent to the second semi-transmissive semi-reflective film.

For example, the light source is disposed at an edge area of the transparent substrate.

For example, a third semi-transmissive semi-reflective film is provided at a side of the transparent substrate which is adjacent to the first semi-transmissive semi-reflective film, and/or a fourth semi-transmissive semi-reflective film is provided at a side of the transparent substrate which is adjacent to the second semi-transmissive semi-reflective film.

For example, a first reflective layer is provided at a side of the transparent substrate which is adjacent to the first semi-transmissive semi-reflective film, and/or a second reflective layer is provided at a side of the transparent substrate which is adjacent to the second semi-transmissive semi-reflective film; and at least a light source is provided at a side of the transparent substrate which is adjacent to the first semi-transmissive semi-reflective film, and at least a light source is provided at a side of the transparent substrate which is adjacent to the second semi-transmissive semi-reflective film.

For example, the first reflective layer and the second reflective layer have same material.

For example, the light source support is a bezel provided outside the first spatial light modulator and the second spatial light modulator; and the light source is located between an orthographic projection area of the first spatial light modulator on the bezel and an orthographic projection area of the second spatial light modulator on the bezel.

For example, the holographic display may further comprise: a first lens disposed within a predetermined distance from a side of the first spatial light modulator which side is away from the light source, and/or a second lens disposed within a predetermined distance from a side of the second spatial light modulator which side is away from the light source; wherein the first lens and the second lens are convergent lenses.

For example, the first semi-transmissive semi-reflective film and the second semi-transmissive semi-reflective film have same material.

For example, the light source is a rotatable light source.

For example, the holographic display may further comprise: a system controller configured to control rotation of the rotatable light source according to a change in a position of human eye; a tracking means connected to the system controller, and configured to capture a position of the human eye and send information of the captured position of human eye to the system controller.

For example, the transparent substrate is located at equal distances to the first spatial light modulator and to the second spatial light modulator, in a direction perpendicular to the display surface of the display.

According to another aspect of the present disclosure, a display device is provided which may comprise a holographic display as set-forth above.

According to yet another aspect of the present disclosure, a display method of a holographic display as set-forth above is provided which comprises: controlling the at least one light source to emit light; and controlling the first spatial light modulator and/or the second spatial light modulator to be turned on.

For example, the light source is a rotatable light source, and the method further comprises: capturing information of a position of human eye, and controlling rotation of the rotatable light source according to a change in the position of human eye.

BRIEF DESCRIPTION OF DRAWINGS

In order to more clearly explain the technical solutions of the embodiments of the present disclosure, a brief introduction will be given below for the drawings of the embodiments. It is obvious that the drawings described below relate to only some embodiments of the present disclosure, and are not for limiting the present disclosure.

DETAILED DESCRIPTIONS OF EMBODIMENTS

Next, the technical solutions in the embodiments of the present disclosure will be explicitly and completely described in combination with the drawings of the embodiments of the present disclosure. Apparently, the described embodiments are merely part of the embodiments of the present disclosure, rather than all the embodiments. All the other embodiments acquired by a person skilled in the art on the basis of the embodiments of the present disclosure without inventive effort shall fall in the scope of the present invention.

Unless otherwise defined, the technical terms or scientific terms used in the present disclosure should be interpreted as ordinary senses understood by those having ordinary skills in the art to which the present disclosure pertains. The words "first", "second", and similar words used in the present disclosure are not intended to denote any order, quantity or importance, but merely serve to distinguish different constituent parts. Words such as "comprise", "include" or any variations thereof are intended to mean that an element or object preceding these words comprises elements or objects, as well as their equivalents, listed after the word, but do not exclude the existence of other elements or objects. Words such as "connecting" or "connected" or the like are not intended to be limited to a physical or mechanical connection, but may include electrical connection which could be direct or indirect. Terms "up", "down", "left", "right", and the like are used only to present a relative positional relation of objects, which may also be possibly changed correspondingly when the absolute positions of the described objects are changed.

Below, the technical solutions of the embodiments of the present disclosure will be explicitly and completely described in combination with the drawings of the embodiments of the present disclosure. Apparently, the described embodiments are merely parts of the embodiments of the present disclosure, rather than all the embodiments.

The holographic displays provided in the embodiments of the present disclosure will be described in detail below in combination with the drawings.

Figure 1:
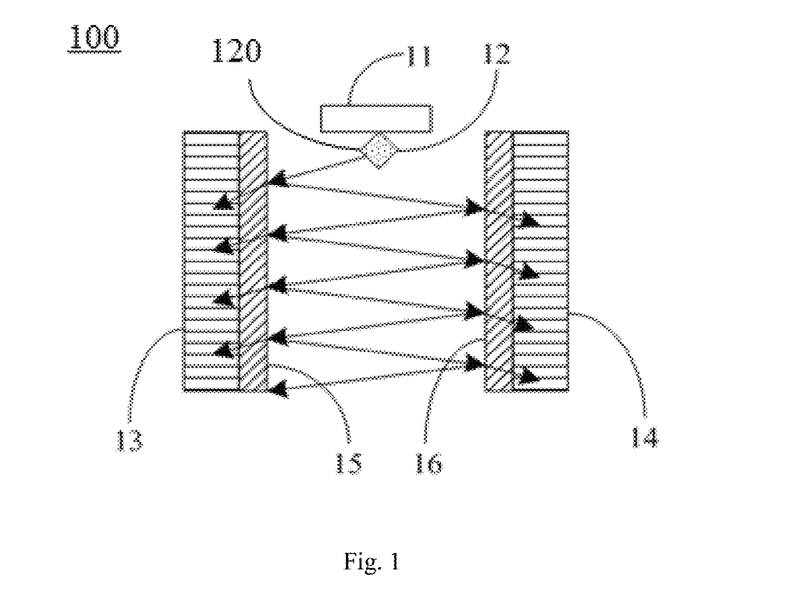
FIG. 1 is a schematic view of the structure of a holographic display according to embodiments of the present disclosure.

As shown in FIG. 1, a holographic display 100 according to the embodiments of the present disclosure is provided which comprises: a light source support 11; a light emitting member 120 provided on the light source support 11; a first spatial light modulator 13 and a second spatial light modulator respectively located at both sides of the light emitting member 120; a first semi-transmissive semi-reflective film 15, located at a side of the first spatial light modulator 13 which is adjacent to the light emitting member 120; and a second semi-transmissive semi-reflective film 16, located at a side of the second spatial light modulator 14 which is adjacent to the light emitting member 120; and the light emitting member 120 includes at least one light source 12.

In an illustrative example, the first semi-transmissive semi-reflective film 15 and the second semi-transmissive semi-reflective film 16 may be disposed opposite to each other, and their projections on a plane parallel to a display surface of the display 100 at least partially overlap with each other.

In an illustrative example, the projections of the first semi-transmissive semi-reflective film 15 and the second semi-transmissive semi-reflective film 16 on a plane parallel to the display surface of the display fully overlap with each other, and the light emitting member 120 is disposed between the first semi-transmissive semi-reflective film 15 and the second semi-transmissive semi-reflective film 16.

In an illustrative example, the display surface of the display 100 is a surface parallel to the first spatial light modulator 13 and the second spatial light modulator 14.

As shown in FIG. 1, since both the first semi-transmissive semi-reflective film 15 and the second semi-transmissive semi-reflective film 16 are capable of reflecting part of the light and transmitting part of the light, a part of the light emitted from the light source 12 and irradiated onto the first semi-transmissive semi-reflective film 15 is reflected and thus irradiated onto the second semi-transmissive semi-reflective film 16, and the remaining part of the light is transmitted through the first semi-transmissive semi-reflective film 15 and irradiated onto the first spatial light modulator 13. The first spatial light modulator 13, after receiving the light, performs phase modulation and amplitude modulation on the light according to the data provided by a data source connected to the first spatial light modulator 13 so that a holographic image can be displayed. Similarly, part of the light irradiated onto the second semi-transmissive semi-reflective film 16 is reflected and again irradiated onto the first semi-transmissive semi-reflective film 15, and the remaining part of the light is transmitted through the second semi-transmissive semi-reflective film 16 and irradiated onto the second spatial light modulator 14. The second spatial light modulator 14, after receiving the light, performs phase modulation and amplitude modulation on the light according to the data provided by a data source connected to the second spatial light modulator 14, so that a holographic image can be displayed. Therefore, when both the first spatial light modulator 13 and the second spatial light modulator 14 in the present disclosure are turned on, a double-sided holographic image display can be achieved. When either of the first spatial light modulator 13 and the second spatial light modulator 14 is turned on, a single-sided hologram display can be achieved. In addition, the present disclosure does not need many optical members to constitute a huge optical system, and can effectuate a light and thin holographic display.

In an illustrative example of the present disclosure, the first spatial light modulator 13 and the second spatial light modulator 14 may be liquid crystal light valves. The specific operation process and operational principle of such a kind of first spatial light modulator 13 and the second spatial light modulator 14 may be known as known to the inventor(s) of the present invention, and herein are omitted from being described in detail.

In an illustrative example of the present disclosure, the light source 12 is a rotatable light source. The rotation angle of the light source 12 may be controlled by a system controller of the holographic display. Other parts of the system controller in the embodiments of the present disclosure may be similar to the system controller included in the holographic display in the prior art, and the specific control method of the other parts may be similar to that in the prior art, and will not be described in detail here. Meanwhile, the entire holographic display in the embodiments of the present disclosure may be controlled by the system controller.

Exemplarily, the light source in the embodiments of the present disclosure is a collimated light source, and the light emitted by the same is parallel light. In an illustrative example of the present disclosure, the light source is a collimated surface light source, which may be implemented by use of a normal light source+a collimator lens; and the embodiment of the present disclosure shall not be limited thereto.

In illustrative embodiments of the present disclosure, the rotatable angle of the light source 12 may be less than 180 degrees. Specifically, the angle of the light source may be adjusted according to the out-going direction of the light. In some embodiments of the present disclosure, as the light incident to the first spatial light modulator 13 or the second spatial light modulator 14 rotates by a certain angle when the light source 12 is rotated by a certain angle, a multi-angle view of the user can be realized by adjusting a rotation angle of the light source. In addition, some specific embodiments of the present disclosure may also implement multi-person viewing by adjusting a rotation angle of the light source and utilizing a visual persistence effect of human eye.

Figure 8:
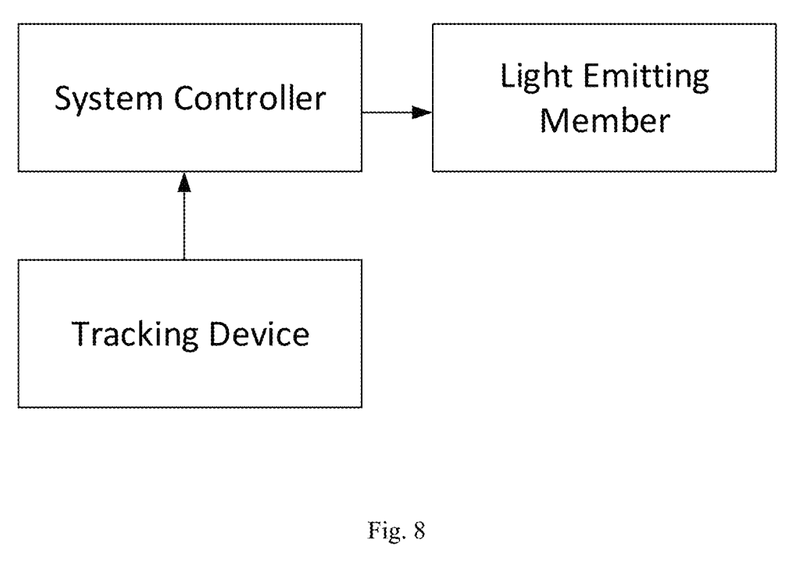
FIG. 8 is an exemplary system block diagram of a holographic display according to embodiments of the present disclosure.

In illustrative embodiments of the present disclosure, as shown in FIG. 8, the holographic display may further comprise a tracking device. The tracking device is connected to a system controller in the embodiments of the present disclosure, for capturing information on a position of human eye, and sending information of the captured position of human eye to the system controller. In the embodiments of the present disclosure, the system controller is also used for controlling the rotation of the rotatable light source according to a change in a position of human eye. In the embodiments of the present disclosure, the tracking device may use an existing device capable of capturing information of a position of human eye. The specific position of the tracking device may be set according to actual production needs. The tracking device is provided to enable better tracking of a specific position of human eye in real time, so as to facilitate a multi-angle and multi-person viewing.

Exemplarily, the tracking device may be disposed on a side of a bezel of the holographic display facing the viewer, or disposed at any position of the holographic display where a position of human eye can be captured. The present disclosure is not limited thereto.

In illustrative embodiments of the present disclosure, the first semi-transmissive semi-reflective film 15 and the second semi-transmissive semi-reflective film 16 have same material. Exemplarily, the first semi-transmissive semi-reflective film 15 and the semi-transmissive semi-reflective film 16 can be formed of aluminum (Al) of a thin thickness. Certainly, in actual production process, for the first semi-transmissive semi-reflective film 15 and the second semi-transmissive semi-reflective film 16, other materials having partial light transmissive and partial reflective properties can be chose. For the materials of the first semi-transmissive semi-reflective film 15 and the second semi-transmissive semi-reflective film 16 different materials may be chose. However, in actual production process, considering the factors such as the cost of the materials, the first semi-transmissive semi-reflective film 15 and the second semi-transmissive semi-reflective film 16 may have the same material.

For example, the light source support in the embodiments of the present disclosure may be a transparent substrate, and may also be a bezel provided outside the first spatial light modulator and the second spatial light modulator.

The specific structure of the holographic display provided in the embodiments of the present disclosure will be introduced in detail below in combination with the drawings. The area size and shape of the various components in the drawings are only intended to schematically illustrate the contents of the embodiments of the present disclosure, and do not necessarily reflect actual proportions of the various components.

Embodiment I

Figure 2:
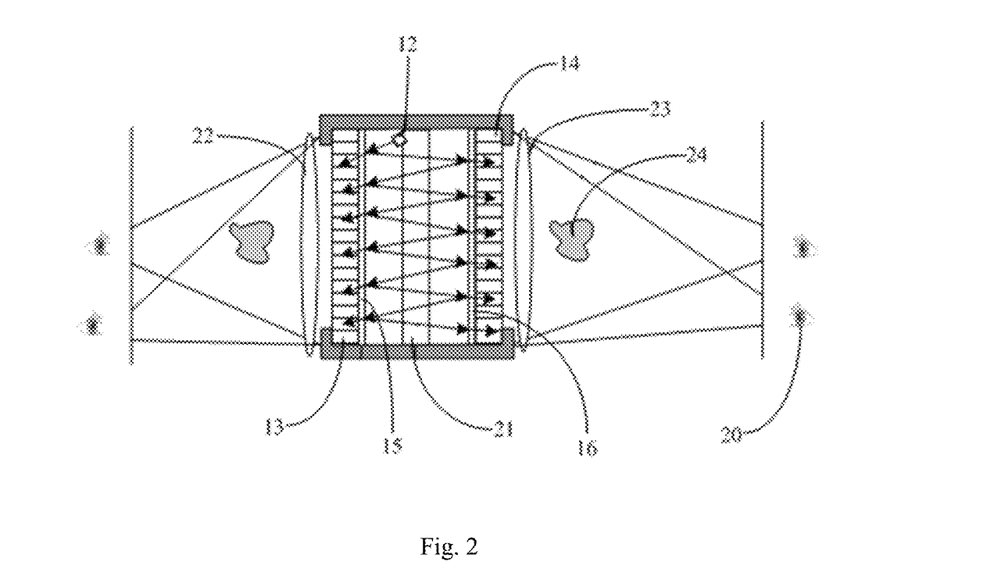
FIG. 2 is a schematic view of the structure of a holographic display according to embodiment I of the present disclosure.

In the embodiments of the present disclosure, as shown in FIG. 2, the light source support is a transparent substrate 21, which is provided between the first spatial light modulator 13 and the second spatial light modulator 14. The light source 12 is disposed at a side of the transparent substrate 21 which is adjacent to the first semi-transmissive semi-reflective film 15, and/or the light source 12 is disposed at a side of the transparent substrate 21 which is adjacent to the second semi-transmissive semi-reflective film 16. FIG. 2 only shows such a case that the light source 12 is disposed at a side of the transparent substrate 21 adjacent to the first semi-transmissive semi-reflective film 15.

In an illustrative example, the transparent substrate 21 may be a glass substrate. The distance between the transparent substrate 21 and the first spatial light modulator 13 may be equal to the distance between the transparent substrate 21 and the second spatial light modulator 14. Certainly, in actual design, the distance between the substrate 21 and the first spatial light modulator 13 may also be unequal to the distance between the transparent substrate 21 and the second spatial light modulator 14. Moreover, in an actual design, in order to enable the light source 12 to be placed in a greater range, the length of the transparent substrate 21 in a vertical direction is equal to the length of the first spatial light modulator 13 or the second spatial light modulator 14 in the vertical direction.

For example, as shown in FIG. 2, the light source 12 in the embodiments of the present disclosure is disposed at an edge area of the transparent substrate 21, so that the light emitted by the light source 12 can be irradiated to the first semi-transmissive semi-reflective film 15 and the second semi-transmissive semi-reflective film 16 to a maximum extent.

In illustrative embodiments of the present disclosure, as shown in FIG. 2, the holographic display further comprises a first lens 22 disposed within a predetermined distance from a side of the first spatial light modulator 13 which side is away from the light source 12, and/or a second lens 23 disposed within a predetermined distance from a side of the second spatial light modulator 14 which side is away from the light source 12. The first lens 22 and the second lens 23 may be convergent lenses. The first lens 22 is used for converging the light emitted by the first spatial light modulator 13. The second lens 23 is used for converging the light emitted by the second spatial light modulator 14. The first lens 22 and the second lens 23 are provided to enable better incidence of the light to human eyes 20.

As shown in FIG. 2, the light source 12 in the embodiments of the present disclosure is a rotatable light source. In the embodiments of the present disclosure, information of a position of human eye 20 may be captured by a tracking device (not shown in the drawings), and may be sent to the system controller (not shown in the drawings). The system controller controls the rotation of the rotatable light source 12 according to a change in the position of human eye 20, so as to effectuate a multi-angle and multi-person viewing. During an actual viewing by a user, the content of the holographic image 24 viewed by a user on the left in FIG. 2 and the content of the holographic image 24 viewed by a user located on the right may be the same, and may also be different.

Figure 3:
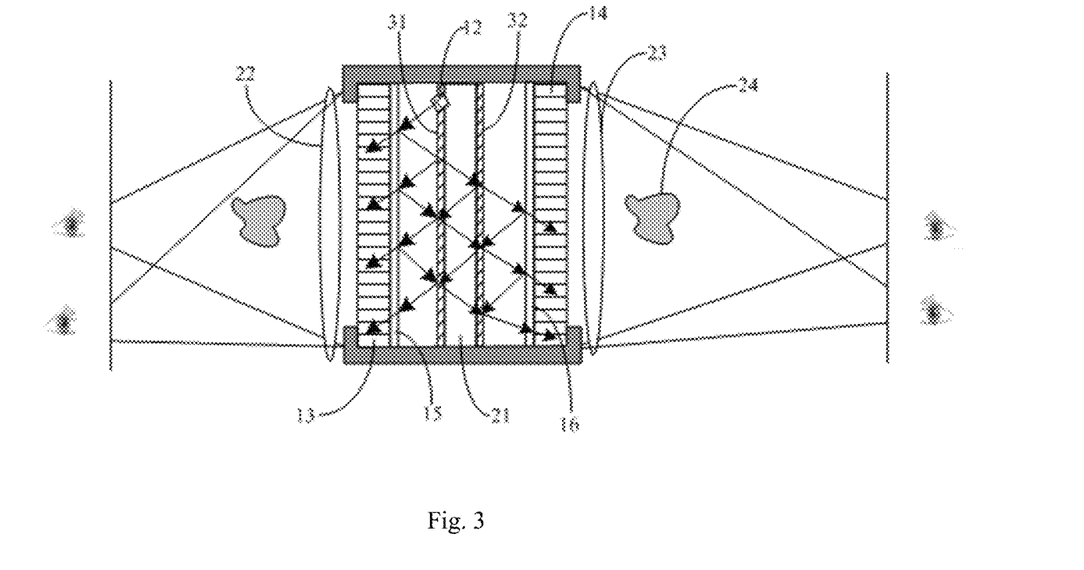
FIG. 3 is a schematic view of the structure of another holographic display according to embodiment I of the present disclosure.

In illustrative embodiments of the present disclosure, as shown in FIG. 3, a third semi-transmissive semi-reflective film 31 is provided at a side of the transparent substrate 21 which is adjacent to the first semi-transmissive semi-reflective film 15, and/or a fourth semi-transmissive semi-reflective film 32 is provided at a side of the transparent substrate 21 which is adjacent to the second semi-transmissive semi-reflective film 16. The drawing only shows such a case in which the third semi-transmissive semi-reflective film 31 and the fourth semi-transmissive semi-reflective film 32 are both provided. The propagation directions of the light emitted by the light source 12 is the directions as shown by the arrows in the drawing.

In an illustrative example, the third semi-transmissive semi-reflective film 31 and the fourth semi-transmissive semi-reflective film 32 may have the same material as the first semi-transmissive semi-reflective film 15 and the second semi-transmissive semi-reflective film 16. Certainly, in an actual production process, for the third semi-transmissive semi-reflective film 31 and the fourth semi-transmissive semi-reflective film 32, other film layers having light reflection and light transmission functions may also be chose. In the embodiments of the present disclosure, there is no special limitation on the specific materials of the third semi-transmissive semi-reflective film 31 and the fourth semi-transmissive semi-reflective film 32.

Figure 4:
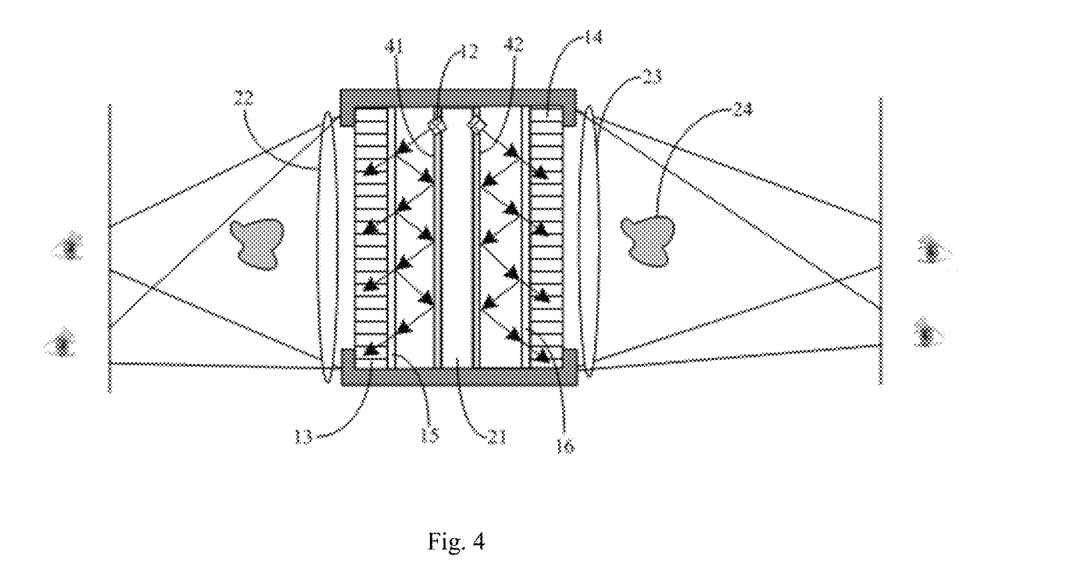
FIG. 4 is a schematic view of the structure of an alternative holographic display according to embodiment I of the present disclosure.

In an illustrative example, as shown in FIG. 4, a first reflective layer 41 is provided at a side of the transparent substrate 21 which is adjacent to the first semi-transmissive semi-reflective film 15, and/or a second reflective layer 42 is provided at a side of the transparent substrate 21 which is adjacent to the second semi-transmissive semi-reflective film 16. The first reflective layer 41 and the second reflective layer 42 are both used for reflecting light. At least a light source 12 is provided at a side of the transparent substrate 21 which is adjacent to the first semi-transmissive semi-reflective film 15. And at least a light source 12 is provided at a side of the transparent substrate 21 which is adjacent to the second semi-transmissive semi-reflective film 16. FIG. 3 only shows such a case in which the first reflective layer 41 and the second reflective layer 42 are both provided, and the propagation direction of the light emitted by the light source 12 is the direction as shown by the arrows in the drawing.

In an illustrative example, the first reflective layer 41 and the second reflective layer 42 have the same material. For example, the materials of the first reflective layer 41 and the second reflective layer 42 are aluminum (Al). Certainly, in actual production process, for the first reflective layer 41 and the second reflective layer 42, other materials having a reflective property may also be chose. For the materials of the first reflective layer 41 and the second reflective layer 42, different materials may also be chose. However, in actual production process, considering factors such as the cost of the materials, the first reflective layer 41 and the second reflective layer 42 may have the same material.

As shown in FIG. 4, when a first reflective layer 41 and a second reflective layer 42 are respectively provided on left and right sides of the transparent substrate 21, in order to realize double-sided display, according to some specific embodiments of the present disclosure, at least a light source 12 needs to be provided on left and right sides of the transparent substrate 21, respectively. FIG. 4 shows such a case in which a light source 12 is provided on a left side and a right side of the transparent substrate 21, respectively.

Figure 5A:
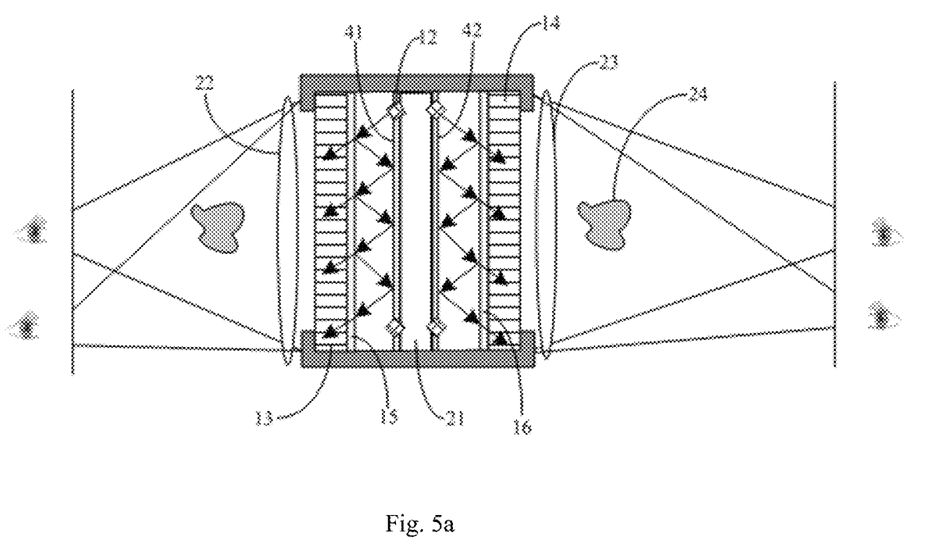
FIGS. 5a and 5b are schematic views of the structures of a further holographic display according to embodiment I of the present disclosure.
Figure 5B:
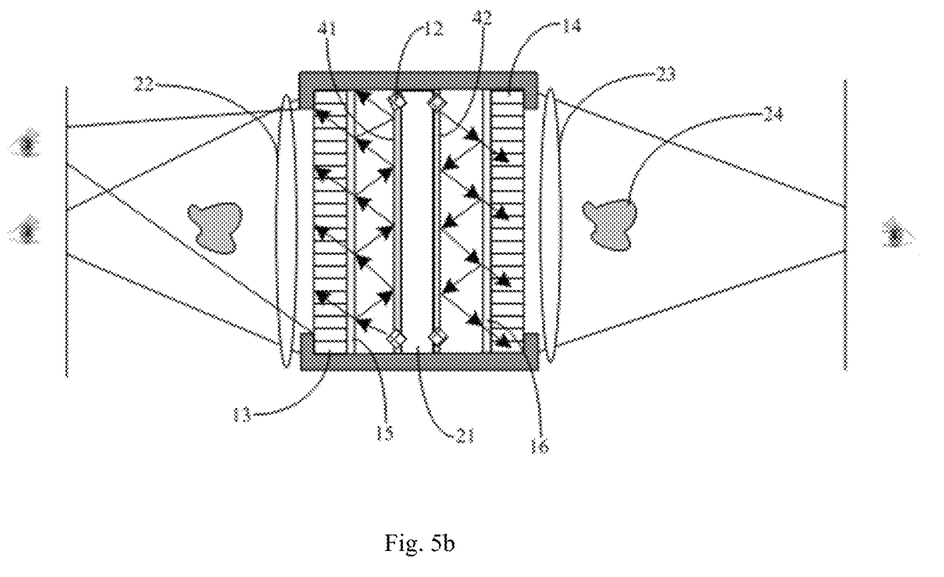

In an illustrative example, as shown in FIG. 5*a* and FIG. 5*b*, two light sources 12 (an upper light source and a lower light source) may be provided on a left side of the transparent substrate 21, and two light sources 12 (an upper light source and a lower light source) may be provided on a right side of the transparent substrate 21. In actual displaying, the upper light sources located on the left and right sides of the transparent substrate 21 in FIG. 5*a* may emit light. Certainly, it may also be the lower light sources located on the left and right sides of the transparent substrate 21 that emits light. In FIG. 5*b*, the lower light source located on the left side of the transparent substrate 21 and the upper light source located on the right side of the transparent substrate 21 emit light. Certainly, it may also be the upper light source located on the left side of the transparent substrate 21 and the lower light source located on the right side of the transparent substrate 21 that emit light.

Embodiment II

Figure 6:
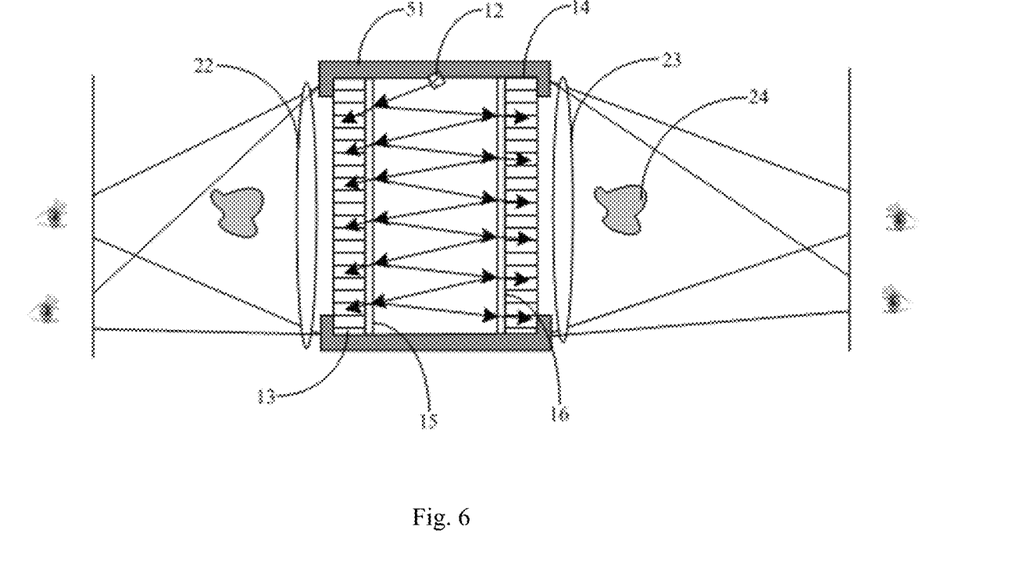
FIG. 6 is a schematic view of the structure of a holographic display according to embodiment II of the present disclosure.

In some specific embodiments of the present disclosure, as shown in FIG. 6, the light source support is a bezel 51 provided outside the first spatial light modulator 13 and the second spatial light modulator 14. The light source 12 is located between an orthographic projection area of the first spatial light modulator 13 on the bezel 51 and an orthographic projection area of the second spatial light modulator 14 on the bezel 51. In an illustrative example, the distance of the light source 12 to the first spatial light modulator 13 is equal to that of the light source 12 to the second spatial light modulator 14.

In illustrative embodiments of the present disclosure, as shown in FIG. 6, the holographic display further comprises a first lens 22 disposed within a predetermined distance from a side of the first spatial light modulator 13 which is away from the light source 12, and/or a second lens 23 disposed within a predetermined distance from a side of the second spatial light modulator 14 which is away from the light source 12. The first lens 22 is used for converging the light emitted from the first spatial light modulator 13. The second lens 23 is used for converging the light emitted from the second spatial light modulator 14. The first lens 22 and the second lens 23 are provided to enable better incidence of the light to human eye.

Based on the same inventive concept(s), the embodiments of the present disclosure further provide a display device, which comprises the aforementioned holographic displays according to the embodiments of the present disclosure. The display device may be such a display device as a liquid crystal panel, a liquid crystal display, a liquid crystal television, an organic light emitting diode (OLED) panel, an OLED display, an OLED television, or electronic paper.

Figure 7:
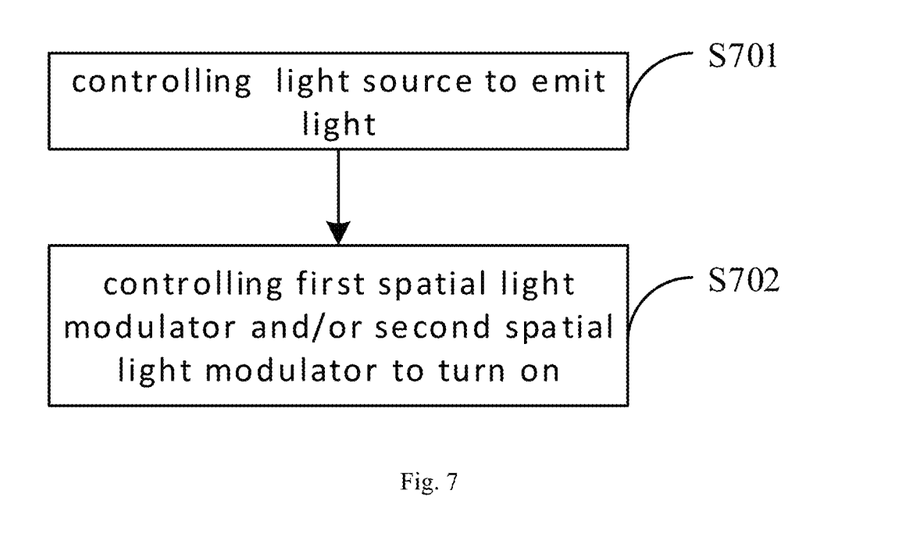
FIG. 7 is a flow diagram of a display method of a holographic display according to embodiments of the present disclosure.

Based on the same inventive concept(s), as shown in FIG. 7, the embodiments of the present disclosure further provide a display method of the aforementioned holographic display(s), comprising:

S701, controlling the light source to emit light; S702, controlling the first spatial light modulator and/or the second spatial light modulator to turn on.

For example, if the light source in the embodiments of the present disclosure is a rotatable light source, the method further comprises: capturing information on a position of human eye(s), and controlling rotation of the rotatable light source according to a change in the information on position of human eye(s).

In illustrative embodiments of the present disclosure, the system controller controls the light emission of the light source, and controls the turn-on or turn-off of the first spatial light modulator and/or the second spatial light modulator. When the first spatial light modulator or the second spatial light modulator is turned off, single-sided display can be realized. When the first spatial light modulator and the second spatial light modulator are both turned on, double-sided display can be realized. Thus, it may be used for exhibition and demonstration of a display window.

To sum up, a holographic display is provided according to the embodiments of the present disclosure, and comprises: a light source support; at least one light source provided on the light source support; a first spatial light modulator and a second spatial light modulator respectively located at both sides of the light source; a first semi-transmissive semi-reflective film, located at a side of the first spatial light modulator adjacent to the light source; and a second semi-transmissive semi-reflective film, located at a side of the second spatial light modulator adjacent to the light source. According to the aforementioned structural configuration of the holographic display in the embodiments of the present disclosure, since both the first semi-transmissive semi-reflective film and the second semi-transmissive semi-reflective film are capable of reflecting part of the light and transmitting part of the light, if the light emitted from the light source is irradiated onto the first semi-transmissive semi-reflective film first, part of the light irradiated onto the first semi-transmissive semi-reflective film is reflected and irradiated onto the second semi-transmissive semi-reflective film, and the remaining part of the light is transmitted and irradiated onto the first spatial light modulator. The first spatial light modulator, after receiving the light, performs phase modulation and amplitude modulation on the light according to the data provided by a data source connected to the first spatial light modulator. Thus, a holographic image can be displayed. Similarly, part of the light irradiated onto the second semi-transmissive semi-reflective film is reflected and again irradiated onto the first semi-transmissive semi-reflective film, and the remaining part of the light is transmitted and irradiated onto the second spatial light modulator. The second spatial light modulator, after receiving the light, performs phase modulation and amplitude modulation on the light according to the data provided by a data source connected to the second spatial light modulator. Thus, a holographic image can be displayed. Thus, when both the first spatial light modulator and the second spatial light modulator in the embodiments of the present disclosure are turned on, a double-sided holographic image display can be achieved. When either of the first spatial light modulator or the second spatial light modulator is turned on, a single-sided hologram display can be achieved. In addition, the embodiments of the present disclosure do not need many optical members to constitute a huge optical system, and can effectuate a light and thin holographic display.

Apparently, those skilled in the art may make various changes and modifications to the embodiments of the present disclosure without departing from the spirit and scope of the present disclosure. In this case, if such changes and modifications fall within the scope of the claims of the present application and the equivalents thereof, they are also intended to be embraced within the present disclosure.

What is claimed is:

1. A holographic display, comprising:
   a light source support;
   a light emitting member including at least one light source and provided on the light source support;
   a first spatial light modulator and a second spatial light modulator respectively located at both sides of the light emitting member;
   a first semi-transmissive semi-reflective film located at a side of the first spatial light modulator which is adjacent to the light emitting member; and
   a second semi-transmissive semi-reflective film located at a side of the second spatial light modulator which is adjacent to the light emitting member.

2. The holographic display according to claim 1, wherein the first semi-transmissive semi-reflective film and the second semi-transmissive semi-reflective film are disposed opposite to each other, and their projections on a plane parallel to a display surface of the display at least partially overlap with each other.

3. The holographic display according to claim 2, wherein the projections of the first semi-transmissive semi-reflective film and the second semi-transmissive semi-reflective film on the plane parallel to the display surface of the display fully overlap with each other.

4. The holographic display according to claim 1, wherein the light source support is a transparent substrate which is provided between the first spatial light modulator and the second spatial light modulator.

5. The holographic display according to claim 4, wherein at least one of:
- the at least one light source is disposed at a side of the transparent substrate which is adjacent to the first semi-transmissive semi-reflective film, or
- the at least one light source is disposed at a side of the transparent substrate which is adjacent to the second semi-transmissive semi-reflective film.

6. The holographic display according to claim 5, wherein the at least one light source is disposed at an edge area of the transparent substrate.

7. The holographic display according to claim 4, wherein at least one of:
- a third semi-transmissive semi-reflective film is provided at a side of the transparent substrate which is adjacent to the first semi-transmissive semi-reflective film, or
- a fourth semi-transmissive semi-reflective film is provided at a side of the transparent substrate which is adjacent to the second semi-transmissive semi-reflective film.

8. The holographic display according to claim 4, wherein at least one of: a first reflective layer is provided at a side of the transparent substrate which is adjacent to the first semi-transmissive semi-reflective film, or a second reflective layer is provided at a side of the transparent substrate which is adjacent to the second semi-transmissive semi-reflective film; and
- at least a light source is provided at a side of the transparent substrate which is adjacent to the first semi-transmissive semi-reflective film, and at least a light source is provided at a side of the transparent substrate which is adjacent to the second semi-transmissive semi-reflective film.

9. The holographic display according to claim 8, wherein the first reflective layer and the second reflective layer have a same material.

10. The holographic display according to claim 1, wherein the light source support is a bezel provided outside the first spatial light modulator and the second spatial light modulator; and
- the at least one light source is located between an orthographic projection area of the first spatial light modulator on the bezel and an orthographic projection area of the second spatial light modulator on the bezel.

11. The holographic display according to claim 1, further comprising at least one of:
- a first lens disposed within a predetermined distance from a side of the first spatial light modulator which is away from the at least one light source,
- a second lens disposed within a predetermined distance from a side of the second spatial light modulator which is away from the at least one light source;
- wherein the first lens and the second lens are convergent lenses.

12. The holographic display according to claim 1, wherein the first semi-transmissive semi-reflective film and the second semi-transmissive semi-reflective film have same material.

13. The holographic display according to claim 1, wherein the at least one light source comprises a rotatable light source.

14. The holographic display according to claim 13, further comprising:
- a system controller configured to control rotation of the rotatable light source according to a change in a position of a human eye,
- a tracking device connected to the system controller, and configured to capture a position of the human eye and send information of the captured position of the human eye to the system controller.

15. The holographic display according to claim 4, wherein the transparent substrate is located at equal distances to the first spatial light modulator and to the second spatial light modulator, in a direction perpendicular to a display surface of the holographic display.

16. A display device, comprising a holographic display according to claim 1.

17. A display method of a holographic display according to claim 1, comprising:
- controlling the at least one light source to emit light;
- controlling at least one of the first spatial light modulator or the second spatial light modulator to turn on.

18. The display method according to claim 17, wherein the at least one light source comprises a rotatable light source, the display method further comprising:
- capturing information of a position of a human eye, and controlling rotation of the rotatable light source according to a change in the position of the human eye.

* * * * *